US009406431B2

United States Patent
Noda

(10) Patent No.: US 9,406,431 B2
(45) Date of Patent: Aug. 2, 2016

(54) TRANSFORMER AND VOLTAGE TRANSFORMING APPARATUS COMPRISING THE SAME

(71) Applicant: Toshihiro Noda, Tokyo (JP)

(72) Inventor: Toshihiro Noda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/424,079

(22) PCT Filed: Dec. 20, 2012

(86) PCT No.: PCT/JP2012/083060
§ 371 (c)(1),
(2) Date: Feb. 26, 2015

(87) PCT Pub. No.: WO2014/097446
PCT Pub. Date: Jun. 26, 2014

(65) Prior Publication Data
US 2015/0213945 A1    Jul. 30, 2015

(51) Int. Cl.
H01F 27/28    (2006.01)
H01F 27/24    (2006.01)
H01F 27/34    (2006.01)
H01F 30/12    (2006.01)
H02M 7/02    (2006.01)
H02M 7/42    (2006.01)

(52) U.S. Cl.
CPC ............. *H01F 27/28* (2013.01); *H01F 27/346* (2013.01); *H01F 30/12* (2013.01); *H02M 7/02* (2013.01); *H02M 7/42* (2013.01); *B60L 2200/26* (2013.01)

(58) Field of Classification Search
CPC ....... H01F 27/28; H01F 27/346; H01F 30/12; H02M 7/02; H02M 7/42; B60L 2202/26
USPC .......................... 336/170, 184, 214, 215, 222
See application file for complete search history.

(56) References Cited

U.S. PATENT DOCUMENTS

| 6,894,596 B2* | 5/2005 | Suzuki | H01F 27/24 323/250 |
| 7,642,889 B2* | 1/2010 | Suzuki | H01F 38/08 336/198 |
| 2005/0212634 A1* | 9/2005 | Baldwin | H01F 27/2871 336/5 |
| 2011/0248813 A1 | 10/2011 | Noda et al. | |

FOREIGN PATENT DOCUMENTS

WO    WO 2010/092676 A1    8/2010

OTHER PUBLICATIONS

International Search Report (PCT/ISA/210) mailed on Apr. 9, 2013, by the Japanese Patent Office as the International Searching Authority for International Application No. .PCT/JP2012/083060.

* cited by examiner

*Primary Examiner* — Mangtin Lian
(74) *Attorney, Agent, or Firm* — Buchanan Ingersoll & Rooney PC

(57) ABSTRACT

A transformer includes a plurality of high-voltage side coils and a plurality of low-voltage side coils. The high-voltage side coils and the corresponding low-voltage side coils form a plurality of coil groups. A first coil group includes one of the high-voltage side coils and one of the low-voltage side coils wound around a first leg and one of the high-voltage side coils and one of the low-voltage side coils wound around a second leg adjacent to the first leg. A second coil group of the plurality of coil groups includes one of the high-voltage side coils and one of the low-voltage side coils wound around the first leg, and one of the high-voltage side coils and one of the low-voltage side coils wound around the second leg.

4 Claims, 10 Drawing Sheets

TRANSFORMER AND VOLTAGE TRANSFORMING APPARATUS COMPRISING THE SAME

TECHNICAL FIELD

The present invention relates to a transformer and a voltage transforming apparatus including the transformer, and specifically to a transformer mounted on an electric vehicle and a voltage transforming apparatus including the transformer.

BACKGROUND ART

Conventionally, there is a need for railroad vehicles such as the Shinkansen bullet train to travel at a higher speed and to have the largest possible transportation capacity. It is thus necessary to reduce the size and the weight of the vehicle body and auxiliary devices, whereas a vehicle-mounted transformer, which has a particularly high mass among the auxiliary devices, is increasing in capacity.

In recent years, there are increasing demands for a low-floor vehicle for the purpose of achieving a barrier-free design. Thus, with regard to underfloor devices such as a vehicle-mounted transformer disposed under the floor of a vehicle such as an AC electric train, there is not only a need for a reduction in size and weight, but also a strong need for a reduction in height to achieve a low-floor vehicle.

WO 2010/092676 (PTD 1) is a prior art document which discloses the configuration of a transformer having a reduced height of the transformer, and in which a decrease in reactance can be prevented. The transformer described in PTD 1 includes a first iron core having a plurality of legs aligned at a distance from each other, a plurality of high-voltage side coils each wound around one of the plurality of legs, and receiving common single-phase AC power, and a plurality of low-voltage side coils provided in correspondence with the high-voltage side coils, magnetically coupled to the corresponding high-voltage side coils, and each wound around one of the plurality of legs. In this transformer, the high-voltage side coils and the low-voltage side coils form a plurality of coil groups. The transformer further includes a second iron core provided between adjacent coil groups.

CITATION LIST

Patent Document

PTD 1: WO 2010/092676

SUMMARY OF INVENTION

Technical Problem

The transformer described in PTD 1, which is provided with the second iron core, has room for improvement in terms of reduction of the weight of the transformer.

The present invention was made in view of the above-described problem, and an object of the invention is to provide a transformer and a voltage transforming apparatus including the transformer which has a reduced size and weight, and in which a decrease in reactance can be prevented.

Solution to Problem

A transformer according to the present invention includes an iron core having a plurality of legs arranged at a distance from each other, a plurality of high-voltage side coils each wound around one of the plurality of legs, and receiving common single-phase AC power, and a plurality of low-voltage side coils provided in correspondence with the high-voltage side coils, magnetically coupled to the corresponding high-voltage side coils, and each wound around one of the plurality of legs. The high-voltage side coils and the corresponding low-voltage side coils constitute a plurality of coil groups. A first coil group of the plurality of coil groups includes one of the high-voltage side coils and one of the low-voltage side coils wound around a first leg of the plurality of legs, and one of the high-voltage side coils and one of the low-voltage side coils wound around a second leg adjacent to the first leg of the plurality of legs. A second coil group of the plurality of coil groups includes one of the high-voltage side coils and one of the low-voltage side coils wound around the first leg, and one of the high-voltage side coils and one of the low-voltage side coils wound around the second leg.

Advantageous Effects of Invention

In the transformer according to the present invention, a reduction in size and weight can be achieved, and a decrease in reactance can be prevented.

DESCRIPTION OF EMBODIMENTS

Figure 1:
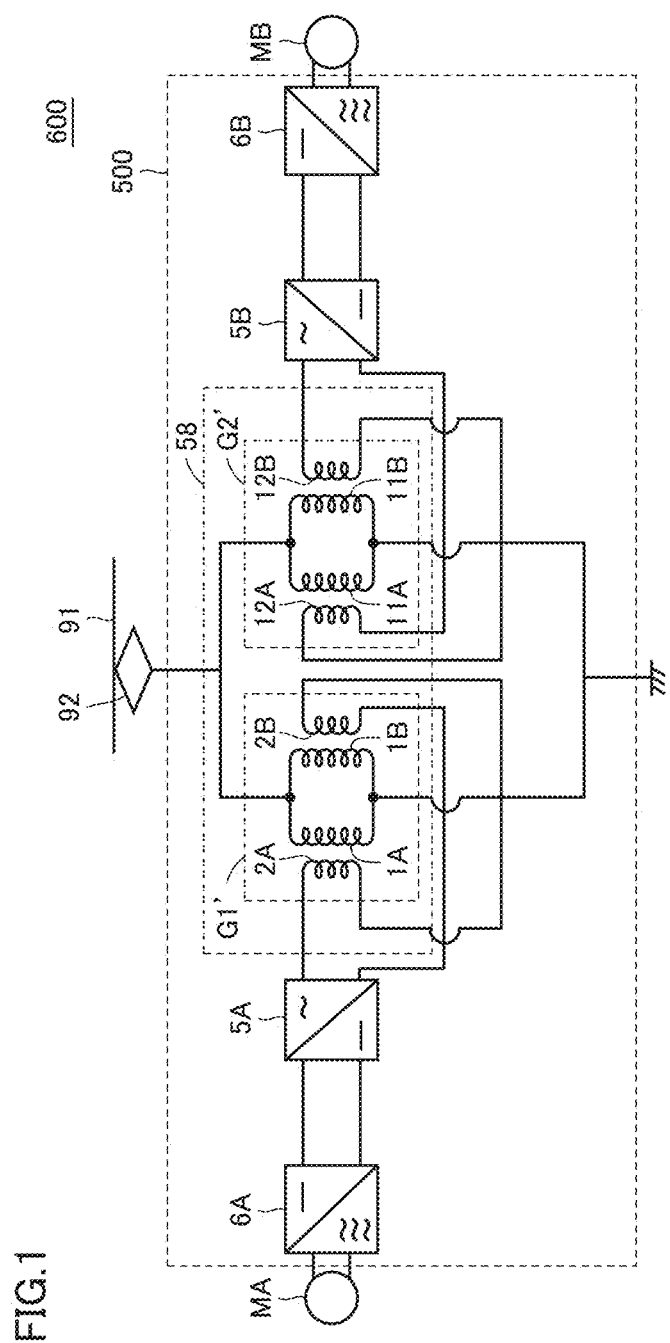
FIG. 1 is a circuit diagram showing the configuration of an AC electric train with a voltage transforming apparatus according to a comparative example.

A transformer according to one embodiment of the present invention and a voltage transforming apparatus including the transformer will be described below, with reference to the accompanying drawings, in which the same or corresponding elements are designated by the same reference characters, and description thereof will not be repeated.

Figure 2:
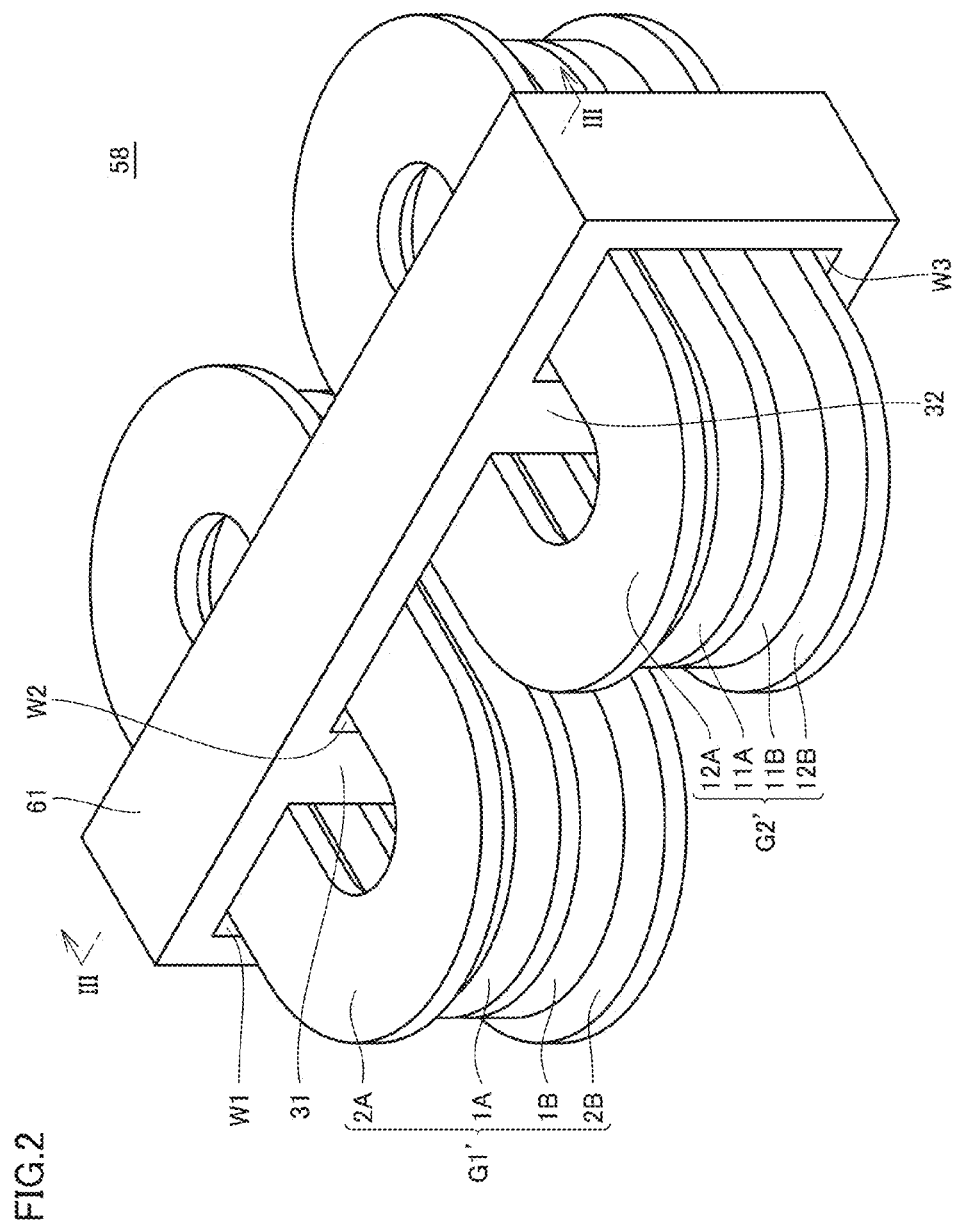
FIG. 2 is a perspective view showing the configuration of a transformer according to the comparative example.
Figure 3:
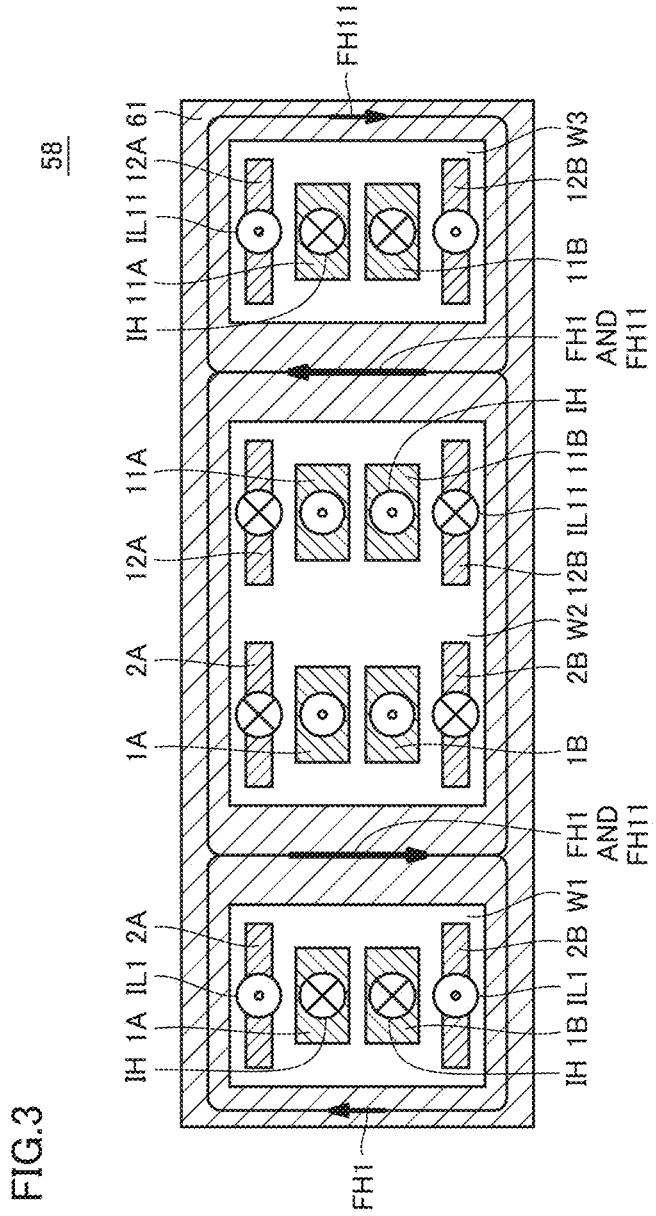
FIG. 3 is a diagram showing a cross section of the transformer taken along line III-III in FIG. 2, as well as current and magnetic flux generated in this transformer.
Figure 4:
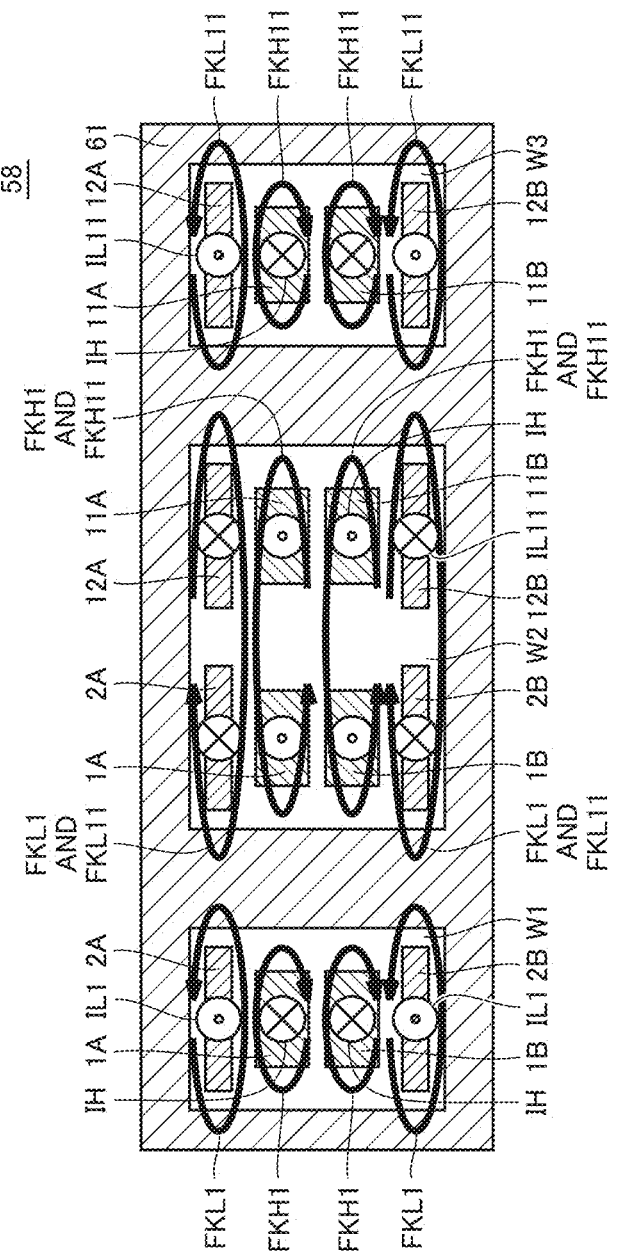
FIG. 4 is a diagram showing leakage flux in the transformer according to the comparative example.

A transformer according to a comparative example and a voltage transforming apparatus including the transformer will be described first. FIG. 1 is a circuit diagram showing the configuration of an AC electric train with a voltage transforming apparatus according to the comparative example. FIG. 2 is a perspective view showing the configuration of the transformer according to the comparative example. FIG. 3 is a diagram showing the cross section of the transformer taken along line III-III in FIG. 2, as well as current and magnetic flux generated in this transformer. FIG. 4 is a diagram showing leakage magnetic flux in the transformer according to the comparative example.

As shown in FIG. 1, an AC electric train 600 includes a pantograph 92, a voltage transforming apparatus 500, and motors MA, MB. Voltage transforming apparatus 500 includes a transformer 58, converters 5A, 5B, and inverters 6A, 6B. Transformer 58 includes coil groups G1' and G2'. Coil group G1' includes high-voltage side coils 1A and 1B and low-voltage side coils 2A and 2B. Coil group G2' includes high-voltage side coils 11A and 11B and low-voltage side coils 12A and 12B.

In transformer 58, each coil is divided into coil groups G1' and G2'. In other words, high-voltage side coils 1A and 1B are obtained by dividing high-voltage side coil 1. Low-voltage side coils 2A and 2B are obtained by dividing low-voltage side coil 2. High-voltage side coils 11A and 11B are obtained by dividing high-voltage side coil 11. Low-voltage side coils 12A and 12B are obtained by dividing low-voltage side coil 12.

Pantograph 92 is connected to overhead wire 91. High-voltage side coils 1A, 1B, 11A, and 11B are connected in parallel with one another. In the comparative example, low-voltage side coil 2A and low-voltage side coil 2B are connected in series. Low-voltage side coil 12A and low-voltage side coil 12B are connected in series.

High-voltage side coil 1A has a first end connected to pantograph 92 and a second end connected to a ground node to which a ground voltage is supplied. High-voltage side coil 1B has a first end connected to pantograph 92 and a second end connected to the ground node to which a ground voltage is supplied.

High-voltage side coil 11A has a first end connected to pantograph 92 and a second end connected to a ground node to which a ground voltage is supplied. High-voltage side coil 11B has a first end connected to pantograph 92 and a second end connected to the ground node to which a ground voltage is supplied.

Low-voltage side coil 2A is magnetically coupled to high-voltage side coil 1A, and has a first end connected to a first input terminal of converter 5A and a second end connected to a first end of low-voltage side coil 2B. Low-voltage side coil 2B is magnetically coupled to high-voltage side coil 1B, and has a first end connected to a second end of low-voltage side coil 2A and a second end connected to a second input terminal of converter 5A.

Low-voltage side coil 12A is magnetically coupled to high-voltage side coil 11A, and has a first end connected to a second end of low-voltage side coil 12B and a second end connected to a second input terminal of converter 5B. Low-voltage side coil 12B is magnetically coupled to high-voltage side coil 11B, and has a first end connected to a first input terminal of converter 5B and a second end connected to a first end of low-voltage side coil 12A.

Single-phase AC voltage supplied from overhead wire 91 is supplied via pantograph 92 to high-voltage side coils 1A, 1B, 11A, and 11B.

The AC voltage supplied to high-voltage side coils 1A and 11A induces an AC voltage in low-voltage side coils 2A and 12A, respectively. The AC voltage supplied to high-voltage side coils 1B and 11B induces an AC voltage in low-voltage side coils 2B and 12B, respectively.

Converter 5A converts the AC voltage induced in low-voltage side coils 2A and 2B into a DC voltage. Converter 5B converts the AC voltage induced in low-voltage side coils 12A and 12B into a DC voltage.

Inverter 6A converts the DC voltage supplied from converter 5A into a three-phase AC voltage, and outputs the voltage to motor MA. Inverter 6B converts the DC voltage supplied from converter 5B into a three-phase AC voltage, and outputs the voltage to motor MB.

Motor MA is driven based on the three-phase AC voltage supplied from inverter 6A. Motor MB is driven based on the three-phase AC voltage supplied from inverter 6B.

As shown in FIG. 2, transformer 58 is a shell-type transformer, for example. Transformer 58 further includes a main iron core 61. Main iron core 61 has a first side surface and a second side surface facing each other, and windows W1 to W3 each passing through the first side surface to the second side surface. Main iron core 61 also has legs 31 and 32 that are arranged at a distance from each other. Leg 31 is disposed between windows W1 and W2. Leg 32 is disposed between windows W2 and W3.

Each of high-voltage side coils 1A, 1B, 11A, 11B and low-voltage side coils 2A, 2B, 12A, 12B includes a plurality of stacked disc windings in the shape of a disc, for example. The disc windings of adjacent layers are electrically connected to each other. Each disc winding in high-voltage side coils 1A, 1B, 11A, 11B and low-voltage side coils 2A, 2B, 12A, 12B is formed by a rectangular conductive line wound in a substantially elliptical shape.

High-voltage side coil 1A is disposed between low-voltage side coil 2A and low-voltage side coil 2B so as to face low-voltage side coil 2A. High-voltage side coil 1A is also magnetically coupled to low-voltage side coil 2A.

High-voltage side coil 1B is connected in parallel with high-voltage side coil 1A, and disposed between low-voltage side coil 2A and low-voltage side coil 2B so as to face low-voltage side coil 2B. High-voltage side coil 1B is also magnetically coupled to low-voltage side coil 2B.

High-voltage side coil 11A is disposed between low-voltage side coil 12A and low-voltage side coil 12B so as to face low-voltage side coil 12A. Low-voltage side coil 11A is also magnetically coupled to low-voltage side coil 12A.

High-voltage side coil 11B is connected in parallel with high-voltage side coil 11A, and disposed between low-voltage side coil 12A and low-voltage side coil 12B so as to face low-voltage side coil 12B. High-voltage side coil 11B is also magnetically coupled to low-voltage side coil 12B.

The high-voltage side coils and the low-voltage side coils in each coil group are wound around the leg through each window located on both sides of the leg, and stacked in a direction in which the leg extends. In other words, high-voltage side coils 1A and 1B and low-voltage side coils 2A and 2B are wound through windows W1 and W2 such that leg 31 between windows W1 and W2 passes through the wound coils. High-voltage side coils 1A and 1B and low-voltage side coils 2A and 2B are also stacked in the direction in which leg 31 passes through the coils.

High-voltage side coils 11A and 11B and low-voltage side coils 12A and 12B are wound through windows W2 and W3 such that leg 32 between windows W2 and W3 passes through the wound coils. High-voltage side coils 11A and 11B and low-voltage side coils 12A and 12B are also stacked in the direction in which leg 32 passes through the coils.

Operation of voltage transforming apparatus 500 according to the comparative example having the above-described configuration will be described below.

First, a single-phase AC voltage is supplied from overhead wire 91 to pantograph 92. The AC voltage supplied from overhead wire 91 is applied through pantograph 92 to high-voltage side coils 1A, 1B, 11A, and 11B. In other words, the high-voltage side coils in each coil group receive common single-phase AC power. This causes an AC current IH to flow through high-voltage side coils 1A, 1B, 11A, and 11B.

As shown in FIG. 3, AC current IH flowing through high-voltage side coils 1A and 1B causes main magnetic flux FH1 to be generated within main iron core 61. Then, main magnetic flux FH1 also causes an AC current IL1 and an AC voltage to be generated in low-voltage side coil 2A, in accordance with a ratio of the number of turns of low-voltage side coil 2A to the number of turns of high-voltage side coil 1A. Main magnetic flux FH1 also causes AC current IL1 and an AC voltage to be generated in low-voltage side coil 2B, in accordance with a ratio of the number of turns of low-voltage side coil 2B to the number of turns of high-voltage side coil 1B.

Since the number of turns of each of low-voltage side coils 2A and 2B is smaller than that of each of high-voltage side coils 1A and 1B, an AC voltage obtained by lowering the AC voltage applied to high-voltage side coils 1A and 1B is induced in each of low-voltage side coils 2A and 2B.

Similarly, AC current IH flowing through high-voltage side coils 11A and 11B causes main magnetic flux FH11 to be generated. Then, main magnetic flux FH11 also causes an AC current IL11 and an AC voltage to be generated in low-voltage side coil 12A, in accordance with a ratio of the number of turns of low-voltage side coil 12A to the number of turns of high-voltage side coil 11A. Main magnetic flux FH11 also causes AC current IL11 and an AC voltage to be generated in low-voltage side coil 12B, in accordance with a ratio between the number of turns of low-voltage side coil 12B to the number of turns of high-voltage side coil 11B.

Since the number of turns of each of low-voltage side coils 12A and 12B is smaller than that of each of high-voltage side coils 11A and 11B, an AC voltage obtained by lowering the AC voltage applied to high-voltage side coils 11A and 11B is induced in each of low-voltage side coils 12A and 12B.

The AC voltage induced in each of low-voltage side coils 2A and 2B is supplied to converter 5A. The AC voltage induced in each of low-voltage side coils 12A and 12B is supplied to converter 5B.

Converter 5A converts the AC voltage supplied from low-voltage side coils 2A and 2B into a DC voltage, and outputs the voltage to inverter 6A. Converter 5B converts the AC voltage supplied from low-voltage side coils 12A and 12B into a DC voltage, and outputs the voltage to inverter 6B.

Inverter 6A converts the DC voltage supplied from converter 5A into a three-phase AC voltage, and outputs the voltage to motor MA. Inverter 6B converts the DC voltage supplied from converter 5B into a three-phase AC voltage, and outputs the voltage to motor MB.

Motor MA is rotated based on the three-phase AC voltage supplied from inverter 6A. Motor MB is also rotated based on the three-phase AC voltage supplied from inverter 6B.

As described above, in transformer 58, the low-voltage side coils and the high-voltage side coils are divided into the plurality of coil groups, and each coil group is provided with a leg. The low-voltage side coils and the high-voltage side coils in each of the plurality of coil groups are each wound around a corresponding one of the legs. This configuration allows a decrease in the height of the transformer, which is the length of the transformer in the direction in which the legs extend. The configuration also eliminates the need to increase the cross-sectional area of the conductor line of the coil, so that an increase in power loss in the coil can be prevented.

In other words, in transformer 58, since low-voltage side coils 2, 12 and high-voltage side coils 1, 11 are divided into two coil groups, the power capacity of each coil group is reduced by half. Since the supplied voltage is constant, and power capacity=voltage×current, when the power capacity of each coil group is reduced by half, the current flowing through each coil is also reduced by half. This allows the number of disc windings to be stacked in each coil to decrease, and therefore, the height of the transformer to decrease. Alternatively, instead of reducing the number of disc windings, the cross-sectional area of the conductor line in each of high-voltage side coils 1A, 1B, 11A, and 11B and low-voltage side coils 2A, 2B, 12A and 12B can be reduced, thereby reducing the height of each coil group, and thus, reducing the height of the entire transformer.

Next, the problem of a decrease in reactance in transformer 58 will be described.

As shown in FIG. 4, in transformer 58, AC current IH flowing through the high-voltage side coils causes, in addition to main magnetic fluxes FH1 and FH11, leakage magnetic fluxes FKH1 and FKH11 that do not flow through main iron core 61 to be generated. AC currents IL1 and IL11 flowing through the low-voltage side coils also cause leakage magnetic fluxes FKL1 and FKL11 that do not flow through main iron core 61 to be generated.

Figure 5:
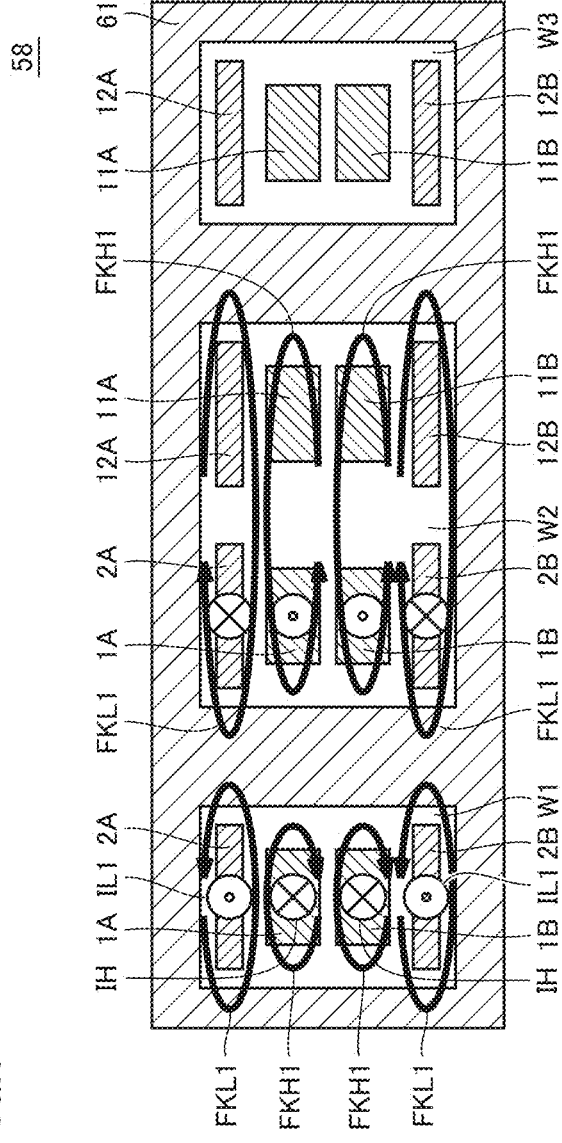
FIG. 5 is a diagram showing main magnetic flux in the transformer according to the comparative example during one-side operation.

FIG. 5 is a diagram showing main magnetic flux in the transformer according to the comparative example during one-side operation. In transformer 58, even when motor MB fails, for example, motor MA can be independently operated using coil group G1'. During this one-side operation, high-voltage side coils 11A and 11B and low-voltage side coils 12A and 12B do not function, that is, no current flows through high-voltage side coils 11A and 11B and low-voltage side coils 12A and 12B, and therefore, main magnetic flux FH11 is not generated.

As shown in FIG. 5, when motor MB fails, and no current flows through high-voltage side coils 11A and 11B and low-voltage side coils 12A and 12B, leakage magnetic fluxes FKH11 and FKL11 are not generated.

Leakage fluxes FKH1 and FKL1 spread within window W2, and become greater in magnetic path length. Thus, the magnetomotive force in window W2 is reduced by half, as compared to the state shown in FIG. 4. In other words, since the magnitude of leakage flux in window W2 is reduced by half, the reactance of each of low-voltage side coils 2A and 2B and high-voltage side coils 1A and 1B decreases.

In this case, the magnetic field strength is inversely proportional to the length of the magnetic path in accordance with Ampere's law. The decreased magnetic field strength means that the magnetic flux density decreases and the self-inductance of the coil decreases. Furthermore, the reactance is significantly influenced by the leakage inductance resulting from the leakage magnetic field. Accordingly, when the length of the magnetic path increases, the strength of the magnetic field decreases, which causes the self-inductance of the coil to decrease. Consequently, when the leakage inductance decreases, the reactance decreases.

Thus, a voltage transforming apparatus 100 according to one embodiment of the present invention has an arrangement of divided coils in coil groups different from that of voltage transforming apparatus 500 according to the comparative example. Voltage transforming apparatus 100 according to one embodiment of the invention will be described below, with reference to the drawings. Description of the same elements as those in voltage transforming apparatus 500 according to the comparative example will not be repeated.

Figure 6:
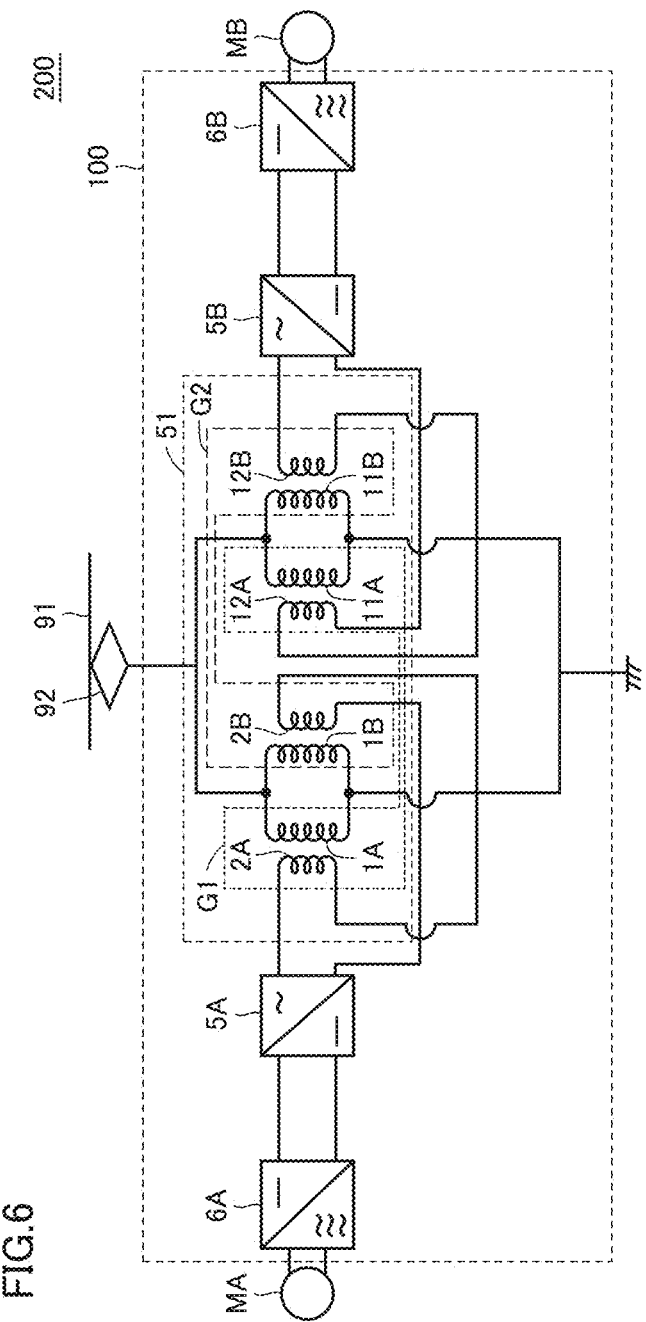
FIG. 6 is a circuit diagram showing the configuration of an AC electric train with a voltage transforming apparatus according to one embodiment of the present invention.
Figure 7:
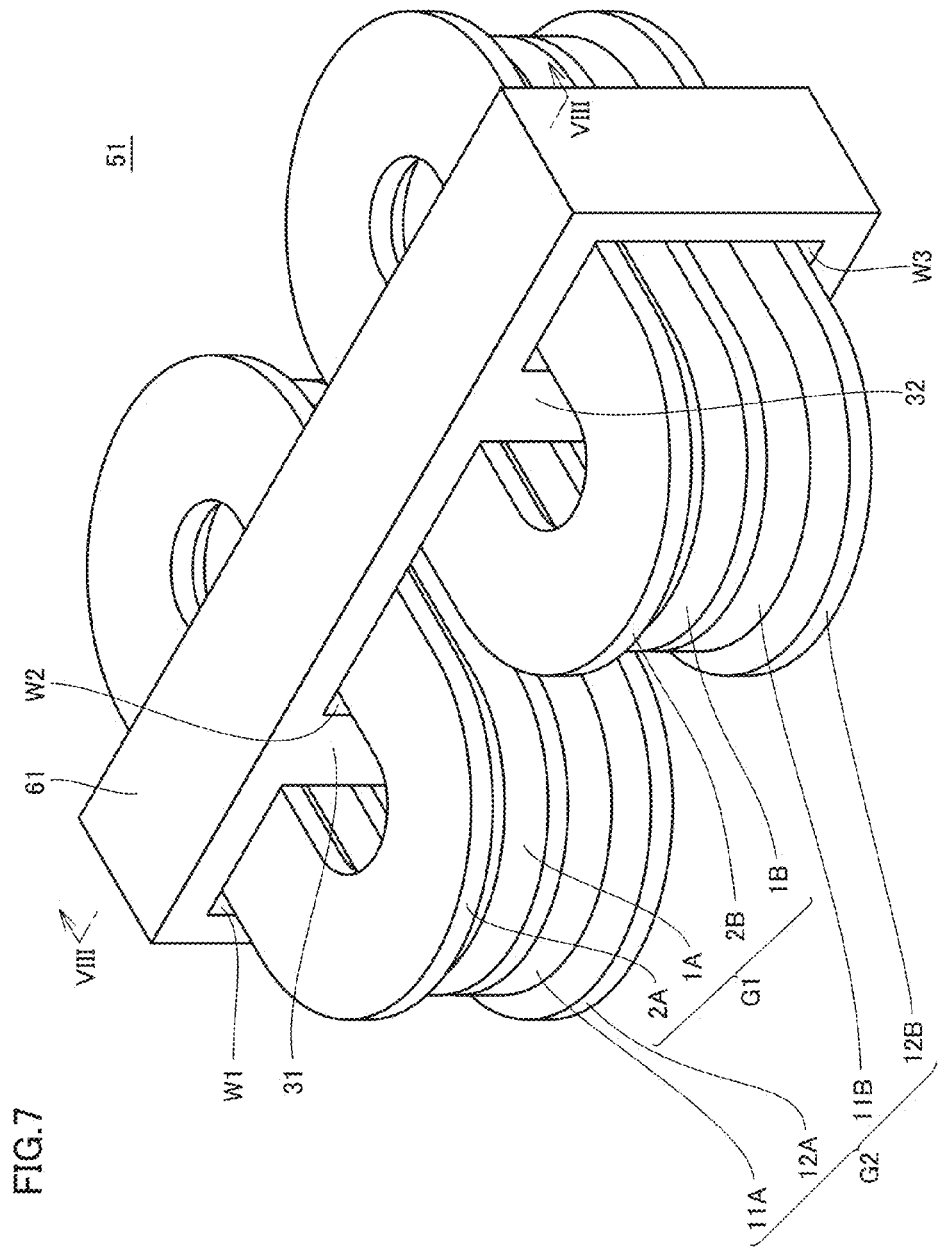
FIG. 7 is a perspective view showing the configuration of a transformer according to the embodiment.
Figure 8:
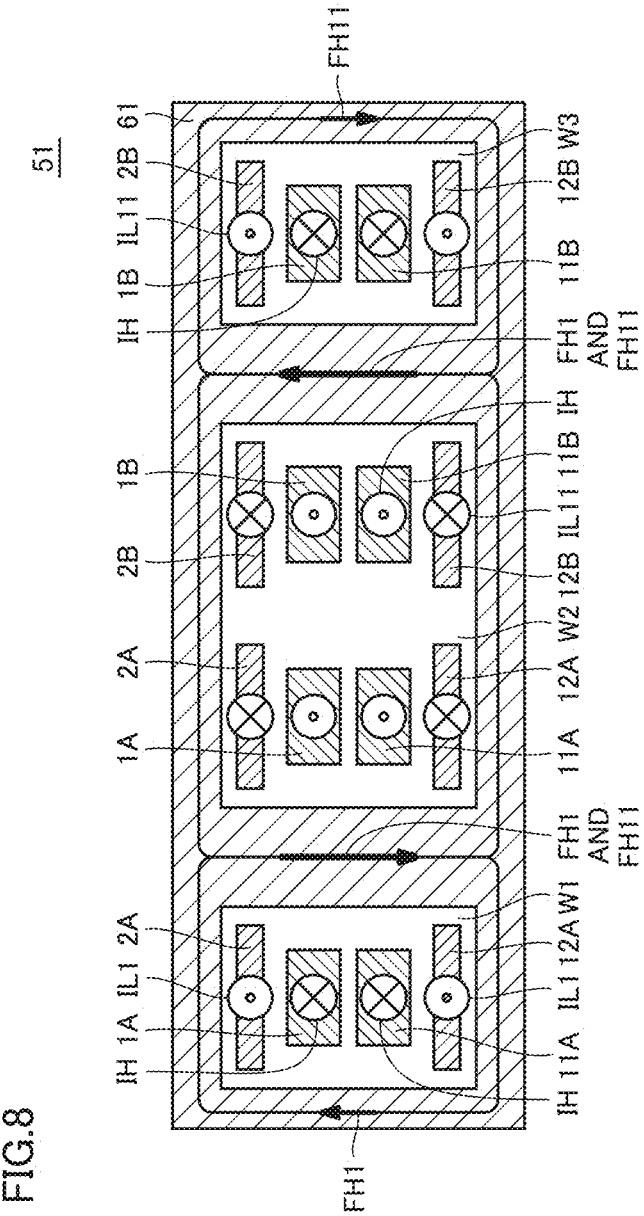
FIG. 8 is a diagram showing a cross section of the transformer taken along line VIII-VIII in FIG. 7, as well as current and magnetic flux generated in this transformer.
Figure 9:
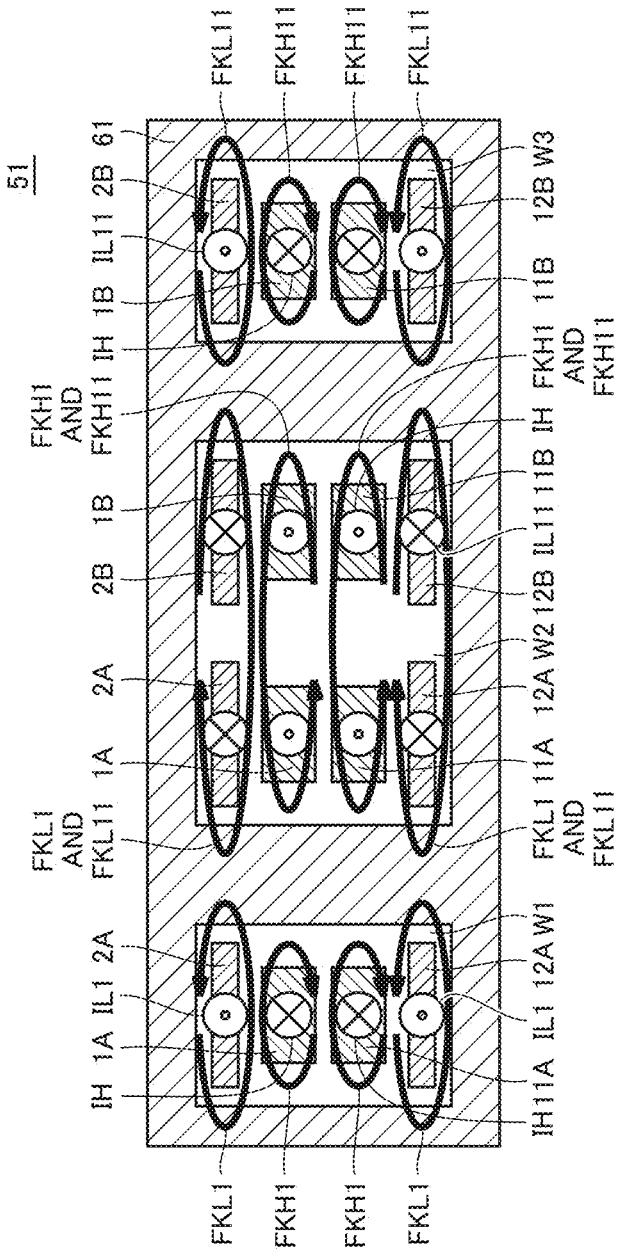
FIG. 9 is a diagram showing leakage magnetic flux in the transformer according to the embodiment.

FIG. 6 is a circuit diagram showing the configuration of an AC electric train with a voltage transforming apparatus according to one embodiment of the invention. FIG. 7 is a perspective view showing the configuration of the transformer according to this embodiment. FIG. 8 is a diagram showing the cross section of the transformer taken along line VIII-VIII in FIG. 7, as well as current and magnetic flux generated in this transformer. FIG. 9 is a diagram showing leakage magnetic flux in the transformer according to this embodiment.

As shown in FIG. 6, AC electric train 200 includes pantograph 92, voltage transforming apparatus 100, and motors MA, MB. Voltage transforming apparatus 100 includes transformer 51, converters 5A and 5B, and inverters 6A and 6B. Transformer 51 includes coil groups G1 and G2. Coil group G1 includes high-voltage side coils 1A and 1B and low-voltage side coils 2A and 2B. Coil group G2 includes high-voltage side coils 11A and 11B and low-voltage side coils 12A and 12B.

In transformer 51, each coil is divided by first coil group G1 and second coil group G2. In other words, high-voltage side coils 1A and 1B are obtained by dividing high-voltage side coil 1. Low-voltage side coils 2A and 2B are obtained by dividing low-voltage side coil 2. High-voltage side coils 11A and 11B are obtained by dividing high-voltage side coil 11. Low-voltage side coils 12A and 12B are obtained by dividing low-voltage side coil 12.

Pantograph 92 is connected to overhead wire 91. High-voltage side coils 1A, 1B, 11A, and 11B are connected in parallel with one another. Note, however, that high-voltage side coil 1A and high-voltage side coil 1B may be connected in series, high-voltage side coil 11A and high-voltage side coil 11B may be connected in series, and high-voltage side coils 1A and 1B and high-voltage side coils 11A and 11B may be connected in parallel.

In this embodiment, low-voltage side coil 2A and low-voltage side coil 2B are connected in series. Low-voltage side coil 12A and low-voltage side coil 12B are connected in series. Note, however, that low-voltage side coil 2A and low-voltage side coil 2B may be connected in parallel, and low-voltage side coil 12A and low-voltage side coil 12B may be connected in parallel.

High-voltage side coil 1A has a first end connected to pantograph 92 and a second end connected to a ground node to which a ground voltage is supplied. High-voltage side coil 1B has a first end connected to pantograph 92 and a second end connected to a ground node to which a ground voltage is supplied.

High-voltage side coil 11A has a first end connected to pantograph 92 and a second end connected to the ground node to which a ground voltage is supplied. High-voltage side coil 11B has a first end connected to pantograph 92 and a second end connected to the ground node to which a ground voltage is supplied.

Low-voltage side coil 2A is magnetically coupled to high-voltage side coil 1A, and has a first end connected to a first input terminal of converter 5A and a second end connected to a first end of low-voltage side coil 2B. Low-voltage side coil 2B is magnetically coupled to high-voltage side coil 1B, and has a first end connected to a second end of low-voltage side coil 2A and a second end connected to a second input terminal of converter 5A.

Low-voltage side coil 12A is magnetically coupled to high-voltage side coil 11A, and has a first end connected to a second end of low-voltage side coil 12B and a second end connected to a second input terminal of converter 5B. Low-voltage side coil 12B is magnetically coupled to high-voltage side coil 11B, and has a first end connected to a first input terminal of converter 5B and a second end connected to a first end of low-voltage side coil 12A.

Single-phase AC voltage supplied from overhead wire 91 is supplied via pantograph 92 to high-voltage side coils 1A, 1B, 11A, and 11B.

The AC voltage supplied to high-voltage side coils 1A and 11A induces an AC voltage in low-voltage side coils 2A and 12A, respectively. The AC voltage supplied to high-voltage side coils 1B and 11B induces an AC voltage in low-voltage side coils 2B and 12B, respectively.

Converter 5A converts the AC voltage induced in low-voltage side coils 2A and 2B into a DC voltage. Converter 5B converts the AC voltage induced in low-voltage side coils 12A and 12B into a DC voltage.

Inverter 6A converts the DC voltage supplied from converter 5A into a three-phase AC voltage, and outputs the voltage to motor MA. Inverter 6B converts the DC voltage supplied from converter 5B into a three-phase AC voltage, and outputs the voltage to motor MB.

Motor MA is driven based on the three-phase AC voltage supplied from inverter 6A. Motor MB is driven based on the three-phase AC voltage supplied from inverter 6B.

As shown in FIG. 7, transformer 51 is a shell-type transformer, for example. Transformer 51 further includes main iron core 61. Main iron core 61 has a first side surface and a second side surface facing each other, and windows W1 to W3 each passing through the first side surface to the second side surface. Main iron core 61 also has a first leg 31 and a second leg 32 that are arranged at a distance from each other. Leg 31 is disposed between windows W1 and W2. Leg 32 is disposed between windows W2 and W3.

Although main iron core 61 has four legs in this embodiment, the number of legs is not limited thereto, and may be two or more. In other words, main iron core 61 may have at least one window.

As shown in FIG. 8, each of high-voltage side coils 1A, 1B, 11A and 11B and low-voltage side coils 2A, 2B, 12A and 12B includes a plurality of stacked disc windings in the shape of a disc, for example. The disc windings in adjacent layers are electrically connected to each other. Each disc winding in high-voltage side coils 1A, 1B, 11A and 11B and low-voltage side coils 2A, 2B, 12A and 12B is formed by a rectangular conductive line wound in a substantially elliptical shape.

High-voltage side coil 1A is disposed between low-voltage side coil 2A and low-voltage side coil 12A so as to face low-voltage side coil 2A. High-voltage side coil 1A is also magnetically coupled to low-voltage side coil 2A.

High-voltage side coil 1B is connected in parallel with high-voltage side coil 1A, and disposed between low-voltage side coil 2B and low-voltage side coil 12B so as to face low-voltage side coil 2B. High-voltage side coil 1B is also magnetically coupled to low-voltage side coil 2B.

High-voltage side coil 11A is disposed between low-voltage side coil 2A and low-voltage side coil 12A so as to face low-voltage side coil 12A. High-voltage side coil 11A is also magnetically coupled to low-voltage side coil 12A.

High-voltage side coil 11B is connected in parallel with high-voltage side coil 11A, and disposed between low-voltage side coil 2B and low-voltage side coil 12B so as to face low-voltage side coil 12B. High-voltage side coil 11B is also magnetically coupled to low-voltage side coil 12B.

The high-voltage side coils and the low-voltage side coils in each coil group are wound around the leg through each window located on both sides of the leg, and stacked in a direction in which the leg extends. In other words, high-voltage side coils 1A and 11A and low-voltage side coils 2A and 12A are wound through windows W1 and W2 such that leg 31 between windows W1 and W2 passes through the wound coils. High-voltage side coils 1A and 11A and low-voltage side coils 2A and 12A are also stacked in the direction in which leg 31 passes through the coils.

High-voltage side coils 1B and 11B and low-voltage side coils 2B and 12B are wound through windows W2 and W3 such that leg 32 between windows W2 and W3 passes through the wound coils. High-voltage side coils 1B and 11B and low-voltage side coils 2B and 12B are also stacked in the direction in which leg 32 passes through the coils.

In other words, in first coil group G1, low-voltage side coil 2A wound around first leg 31 and low-voltage side coil 2B wound around second leg 32 are each coupled to an identical load. In second coil group G2, low-voltage side coil 12A wound around first leg 31 and low-voltage side coil 12B wound around second leg 32 are each coupled to an identical load.

This invention, however, is not limited to the above, and in first coil group G1, low-voltage side coil 2A wound around first leg 31 and low-voltage side coil 2B wound around second leg 32 may each be coupled to separate legs. In second coil group G2, low-voltage side coil 12A wound around first leg 31 and low-voltage side coil 12B wound around second leg 32 may each be coupled to separate legs.

Operation of voltage transforming apparatus 100 according to this embodiment having the above-described configuration will be described below.

First, a single-phase AC voltage is supplied from overhead wire 91 to pantograph 92. The AC voltage supplied from overhead wire 91 is applied through pantograph 92 to high-voltage side coils 1A, 1B, 11A, and 11B. In other words, the high-voltage side coils in each coil group receive common single-phase AC power. This causes AC current IH to flow through high-voltage side coils 1A, 1B, 11A, and 11B.

AC current IH flowing through high-voltage side coils 1A and 11A causes main magnetic flux FH1 to be generated within main iron core 61. Then, main magnetic flux FH1 also causes an AC current IL1 and an AC voltage to be generated in low-voltage side coil 2A, in accordance with a ratio of the number of turns of low-voltage side coil 2A to the number of turns of high-voltage side coil 1A. Main magnetic flux FH1 also causes AC current IL1 and an AC voltage to be generated in low-voltage side coil 12A, in accordance with a ratio of the number of turns of low-voltage side coil 12A to the number of turns of high-voltage side coil 11A.

Since the number of turns of each of low-voltage side coils 2A and 12A is smaller than that of each of high-voltage side coils 1A and 11A, an AC voltage obtained by lowering the AC voltage applied to high-voltage side coils 1A and 11A is induced in each of low-voltage side coils 2A and 12A.

Similarly, AC current IH flowing through high-voltage side coils 1B and 11B causes main magnetic flux FH11 to be generated. Then, main magnetic flux FH11 also causes an AC current IL11 and an AC voltage to be generated in low-voltage side coil 2B, in accordance with a ratio of the number of turns of low-voltage side coil 2B to the number of turns of high-voltage side coil 1B. Main magnetic flux FH11 also causes AC current IL11 and an AC voltage to be generated in low-voltage side coil 12B, in accordance with a ratio of the number of turns of low-voltage side coil 12B to the number of turns of high-voltage side coil 11B.

Since the number of turns of each of low-voltage side coils 2B and 12B is smaller than that of each of high-voltage side coils 1B and 11B, an AC voltage obtained by lowering the AC voltage applied to high-voltage side coils 1B and 11B is induced in each of low-voltage side coils 2B and 12B.

The AC voltage induced in each of low-voltage side coils 2A and 2B is supplied to converter 5A. Furthermore, the AC voltage induced in each of low-voltage side coils 12A and 12B is supplied to converter 5B.

Converter 5A converts the AC voltage supplied from low-voltage side coils 2A and 2B into a DC voltage, and outputs the voltage to inverter 6A. Converter 5B converts the AC voltage supplied from low-voltage side coils 12A and 12B into a DC voltage, and outputs the voltage to inverter 6B.

Inverter 6A converts the DC voltage supplied from converter 5A into a three-phase AC voltage, and outputs the voltage to motor MA. Inverter 6B converts the DC voltage supplied from converter 5B into a three-phase AC voltage, and outputs the voltage to motor MB.

Motor MA is rotated based on the three-phase AC voltage supplied from inverter 6A. Motor MB is also rotated based on the three-phase AC voltage supplied from inverter 6B.

Thus, in transformer 51, the low-voltage side coils and the high-voltage side coils are divided into the plurality of coil groups. The low-voltage side coils and the high-voltage side coils in each of the plurality of coil groups are each wound around a corresponding one of the legs. This configuration allows a decrease in the height of the transformer, which is the length of the transformer in the direction in which the legs extend. The configuration also eliminates the need to increase the cross-sectional area of the conductor line of the coil, so that an increase in power loss in the coil can be prevented.

In other words, in transformer 51, since low-voltage side coils 2, 12 and high-voltage side coils 1, 11 are divided into two coil groups, the power capacity of each coil group is reduced by half. Since the supplied voltage is constant, and power capacity=voltage×current, when the power capacity of each coil group is reduced by half, the current flowing through each coil is also reduced by half. This allows the number of disc windings to be stacked in each coil to decrease, and therefore, the height of the transformer to decrease. Alternatively, instead of reducing the number of disc windings, the cross-sectional area of the conductor line in each of high-voltage side coils 1A, 1B, 11A, and 11B and low-voltage side coils 2A, 2B, 12A and 12B can be reduced, thereby reducing the height of each coil group, and thus, reducing the height of the entire transformer.

Next, the reactance of transformer 51 will be described.

As shown in FIG. 9, in transformer 51, AC current IH flowing through the high-voltage side coils causes, in addition to main magnetic fluxes FH1 and FH11, leakage magnetic fluxes FKH1 and FKH11 that do not flow through main iron core 61 to be generated. AC currents IL1 and IL11 flowing through the low-voltage side coils also cause leakage magnetic fluxes FKL1 and FKL11 that do not flow through main iron core 61 to be generated.

Figure 10:
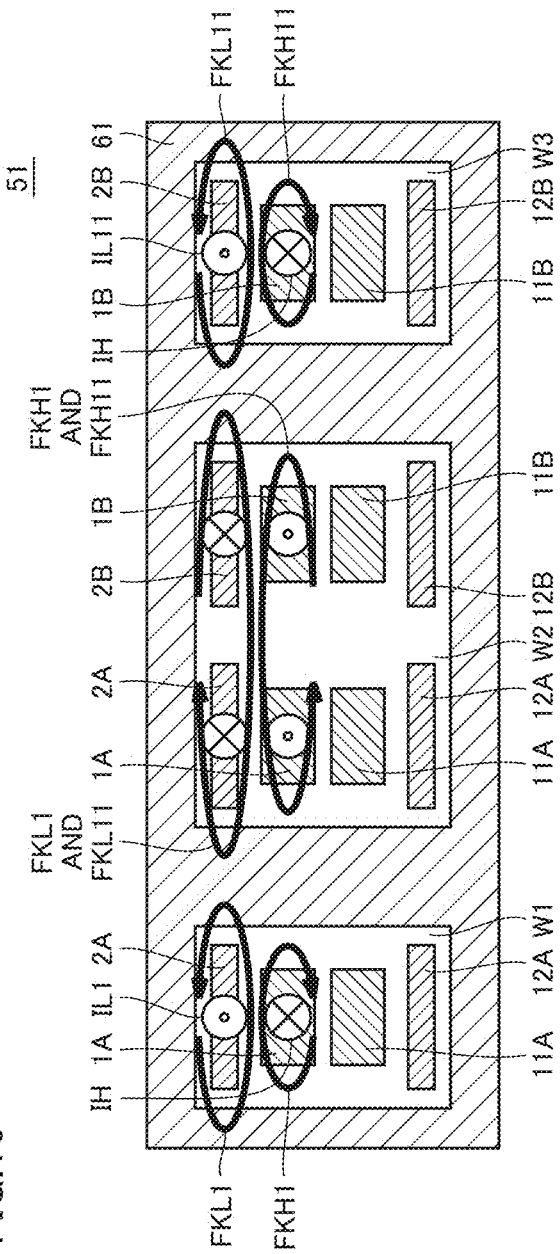
FIG. 10 is a diagram showing main magnetic flux in the transformer according to the embodiment during one-side operation.

FIG. 10 is a diagram showing main magnetic flux in the transformer according to this embodiment during one-side operation. In transformer 51, for example, even when motor MB fails, motor MA can be independently operated using coil group G1. During the one-side operation as described above, high-voltage side coils 11A and 11B and low-voltage side coils 12A and 12B do not function, that is, no current flows through high-voltage side coils 11A and 11B and low-voltage side coils 12A and 12B.

As shown in FIG. 10, even when motor MB fails, and no current flows through high-voltage side coils 11A and 11B and low-voltage side coils 12A and 12B, leakage fluxes FKH1 and FKH11, as well as leakage fluxes FKL1 and FKL11 are synthesized, as in the state shown in FIG. 9, such that the magnetomotive force within window W2 does not change. Furthermore, the magnetic path lengths of leakage fluxes FKH1 and FKH11 and the magnetic path lengths of leakage fluxes FKL1 and FKL11 do not change, either. Consequently, the reactance of each of high-voltage side coils 1A and 1B and low-voltage side coil 2A and 2B does not decrease.

Even when motor MA fails, similarly, the reactance of each of high-voltage side coils 11A and 11B and low-voltage side coils 12A and 12B does not decrease.

In voltage transforming apparatus 100 according to this embodiment, the coils are divided into the plurality of coil groups, as described above, which eliminates the need to provide a second iron core, thereby achieving a reduction in size and weight while allowing a decrease in reactance to be prevented.

It is noted that the embodiments disclosed herein are illustrative in every respect, and do not serve as a basis for restrictive interpretation. Therefore, the technical scope of the present invention should not be interpreted based on the foregoing embodiments only, and is defined based on the description in the scope of the claims. Further, any modifications within the scope and meaning equivalent to the scope of the claims are included.

REFERENCE SIGNS LIST 1, 11, 1A, 1B, 11A and 11B: high-voltage side coil; 2, 12, 2A, 2B, 12A and 12B: low-voltage side coil; 5A and 5B: converter; 6A and 6B: inverter; 31: first leg; 32: second leg; 51, 58: transformer; 61: main iron core; 91: overhead wire; 92: pantograph; 100 and 500: voltage transforming apparatus; 200 and 600: AC electric train; FH1 and FH11: main magnetic flux; FKH1, FKH11, FKL1 and FKL11: leakage magnetic flux; G1: first coil group; G2: second coil group; IH, IL1 and IL11: AC current; MA and MB: motor; W1 to W3: window.

The invention claimed is:

1. A transformer comprising:
an iron core having a plurality of legs arranged at a distance from each other;
a plurality of high-voltage side coils each wound around one of said plurality of legs, and receiving common single-phase AC power; and
a plurality of low-voltage side coils provided in correspondence with said high-voltage side coils, magnetically coupled to corresponding said high-voltage side coils, and each wound around one of said plurality of legs,
said high-voltage side coils and corresponding said low-voltage side coils constituting a plurality of coil groups,
a first coil group of said plurality of coil groups including one of said high-voltage side coils and one of said low-voltage side coils corresponding to the one of said high-voltage side coils, each wound around a first leg of said plurality of legs, and one of said high-voltage side coils and one of said low-voltage side coils corresponding to the one of said high-voltage side coils, each wound around a second leg adjacent to said first leg of said plurality of legs, and
a second coil group of said plurality of coil groups including one of said high-voltage side coils and one of said low-voltage side coils corresponding to the one of said high-voltage side coils, each wound around said first leg, and one of said high-voltage side coils and one of said low-voltage side coils corresponding to the one of said high-voltage side coils, each wound around said second leg,
in said first coil group, the one of said high-voltage side coils wound around said first leg and the one of said high-voltage side coils wound around said second leg being located adjacent to each other, and the one of said low-voltage side coils wound around said first leg and the one of said low-voltage side coils wound around said second leg being located adjacent to each other,
in said second coil group, the one of said high-voltage side coils wound around said first leg and the one of said high-voltage side coils wound around said second leg being located adjacent to each other, and the one of said low-voltage side coils wound around said first leg and the one of said low-voltage side coils wound around said second leg being located adjacent to each other,
in said first coil group, the one of said low-voltage side coils wound around said first leg and the one of said low-voltage side coils wound around said second leg each being coupled to an identical load, and
in said second coil group, the one of said low-voltage side coils wound around said first leg and the one of said low-voltage side coils wound around said second leg each being coupled to an identical load different from said load to which said first coil group is coupled.

2. A voltage transforming apparatus comprising:
the transformer according to claim 1; and
a converter that converts an AC voltage induced in said low-voltage side coils into a DC voltage.

3. The voltage transforming apparatus according to claim 2, further comprising an inverter that converts the DC voltage converted by said converter into a three-phase AC voltage.

4. The voltage transforming apparatus according to claim 2, which is mounted on an electric vehicle.

* * * * *